United States Patent
Larsen et al.

(10) Patent No.: US 9,915,377 B2
(45) Date of Patent: Mar. 13, 2018

(54) UNDERWATER PIPE ASSEMBLY AND METHOD OF ASSEMBLING UNDERWATER PIPES

(71) Applicants: Jan Larsen, Nicosia (CY); Chen-Shan Kung, Taipei (TW); Yuan-Jui Lu, Taipei (TW)

(72) Inventors: Jan Larsen, Nicosia (CY); Chen-Shan Kung, Taipei (TW); Yuan-Jui Lu, Taipei (TW)

( * ) Notice: Subject to any disclaimer, the term of this patent is extended or adjusted under 35 U.S.C. 154(b) by 147 days.

(21) Appl. No.: 15/182,406

(22) Filed: Jun. 14, 2016

(65) Prior Publication Data

US 2016/0377198 A1    Dec. 29, 2016

(30) Foreign Application Priority Data

Jun. 24, 2015  (TW) .................................. 104120329

(51) Int. Cl.
*F16L 1/26* (2006.01)
*F16L 23/036* (2006.01)
*F16L 23/032* (2006.01)

(52) U.S. Cl.
CPC ............... *F16L 1/26* (2013.01); *F16L 23/032* (2013.01); *F16L 23/036* (2013.01)

(58) Field of Classification Search
CPC ......... F16L 1/26; F16L 23/024; F16L 23/028; F16L 23/0283; F16L 23/032; F16L 23/036
USPC .......................................... 285/406, 411, 412
See application file for complete search history.

(56) References Cited

U.S. PATENT DOCUMENTS

| | | | |
|---|---|---|---|
| 400,262 A * | 3/1889 | Smith | |
| 422,177 A * | 2/1890 | Bayles | |
| 659,888 A * | 10/1900 | Dresser | |
| 943,461 A * | 12/1909 | Reynolds | |
| 977,226 A * | 12/1910 | Sargent | |
| 1,986,419 A * | 1/1935 | Taylor .................... | F16L 23/02 285/328 |

(Continued)

FOREIGN PATENT DOCUMENTS

| CA | 1267177 A | 3/1990 |
|---|---|---|
| CN | 2378612 Y | 5/2000 |

(Continued)

OTHER PUBLICATIONS

TW104120329 Taiwan Search Report dated Apr. 7, 2016 (2 pages).
(Continued)

*Primary Examiner* — James M Hewitt, II
(74) *Attorney, Agent, or Firm* — Michael Best & Friedrich LLP

(57) ABSTRACT

An underwater pipe assembly includes a first pipe having a first collar and a first flange, a second pipe having a second collar and a second flange, and a connector apparatus including at least two first clamp seats, at least two first fasteners, at least two second clamp seats, at least two second fasteners. The first clamp seats are interconnected by the first fasteners to surround a junction of the first collar and the first flange. The second clamp seats are interconnected by the second fasteners to surround a junction of the second collar and the second flange. A plurality of connecting fasteners interconnect the first and second clamp seats, thereby clamping the first and second flanges between the first and second clamp seats.

4 Claims, 4 Drawing Sheets

(56) References Cited

U.S. PATENT DOCUMENTS

| | | | |
|---|---|---|---|
| 2,969,995 | A | 1/1961 | Boughton |
| 3,191,969 | A | 6/1965 | Wrenshall |
| 3,756,629 | A | 9/1973 | Gibb |
| 3,761,114 | A | 9/1973 | Blakeley |
| 6,581,984 | B1 * | 6/2003 | Seung-Kyu .......... F16L 25/0036 285/368 |

FOREIGN PATENT DOCUMENTS

| | | |
|---|---|---|
| CN | 2643126 Y | 9/2004 |
| CN | 201575246 U | 9/2010 |
| CN | 201897025 U | 7/2011 |
| CN | 203880273 U | 10/2014 |
| CN | 204300567 U | 4/2015 |
| WO | 8600971 A1 | 2/1986 |
| WO | WO-2012024799 A2 * | 3/2012 ........... E21B 19/002 |

OTHER PUBLICATIONS

TW104120329 Taiwan Search Report dated Jan. 5, 2017 (2 pages).
Search Report and Written Opinion from the Intellectual Property Office of Singapore for Application No. 10201604549V dated Oct. 3, 2016 (9 pages).

* cited by examiner

US 9,915,377 B2

UNDERWATER PIPE ASSEMBLY AND METHOD OF ASSEMBLING UNDERWATER PIPES

CROSS-REFERENCE TO RELATED APPLICATION

This application claims priority to Taiwanese Application No. 104120329, filed on Jun. 24, 2015.

FIELD

The disclosure relates to a pipe assembly, and more particularly to an underwater pipe assembly and a method for assembling underwater pipes.

BACKGROUND

As shown in FIG. 1, a conventional underwater pipe assembly used for pumping seawater includes two adjacent pipes 1 and a connector apparatus. Each pipe 1 has a pipe body 101 extending along a longitudinal axis, and two annular flanges 102 projecting radially, outwardly and respectively from two opposite ends of the pipe body 101. The flange 102 at one end of one of the pipes 1 abuts against the flange 102 at a corresponding end of the adjacent pipe 1. The connector apparatus includes a plurality of angularly spaced-apart connecting units 2 disposed around the abutted flanges 102 of the adjacent pipes 1. Each of the connecting units 2 includes two clamp plates 201 respectively abutting against the flanges 102 of the adjacent pipes 1 that abut against each other, and a fastener 202 securing the clamp plates 201 so as to clamp the abutted flanges 102 of the adjacent pipes 1 therebetween. By using the connector apparatus 2, the use length of the pipes 1 may be extended.

However, when a fastening force of the fastener 202 to secure the two clamp plates 201, each having an I-cross section relative to the longitudinal axis, is excessive, the clamp plates 201 are likely to deviate such that inner portions thereof move away from each other and outer portions thereof move toward each other. This causes the connecting effect of the connector apparatus to be poor which in turn may cause leakage of seawater during pumping.

SUMMARY

Therefore, an object of the disclosure is to provide an underwater pipe assembly that can alleviate the drawback of the prior art.

Another object of the disclosure is to provide a method for assembling underwater pipes.

According to one aspect of the disclosure, an underwater pipe assembly includes a first pipe, a second pipe and a connector apparatus.

The first pipe includes a first pipe body extending along a longitudinal axis, an annular first collar projecting radially and outwardly from a peripheral end of the first pipe body, and an annular first flange projecting radially and outwardly from a peripheral end of the first collar and having a first end surface and a second end surface opposite to the first end surface along the longitudinal axis.

The second pipe includes a second pipe body extending along the longitudinal axis, an annular second collar projecting radially and outwardly from a peripheral end of the second pipe body, and an annular second flange projecting radially and outwardly from a peripheral end of the second collar and having a first end surface abutting against the first end surface of the first flange, and a second end surface opposite to the first end surface of the second flange along the longitudinal axis.

The connector apparatus includes at least two first clamp seats, at least two first fasteners, at least two second clamp seats, at least two second fasteners and a plurality of connecting fasteners.

The first clamp seats are disposed on and surround a junction of the first collar and the first flange. Each of the first clamp seats has a first abutment plate extending along the longitudinal axis and abutting against an outer circumferential surface of the first collar, a first connecting plate extending outwardly and radially from the first abutment plate and abutting against the second end surface of the first flange, two first end plates each of which interconnects one end of the first abutment plate and a corresponding one end of the first connecting plate and each of which is formed with a first aperture, and a plurality of angularly spaced-apart first through holes formed in the first connecting plate.

Each of the first fasteners extends through the first aperture in one of the first end plates of one of the first clamp seats and the first aperture in an adjacent one of the first end plates of the other first clamp seat to fixedly interconnect the two adjacent first endplates.

The second clamp seats are disposed on and surround a junction of the second collar and the second flange. Each of the second clamp seats has a second abutment plate extending along the longitudinal axis and abutting against an outer circumferential surface of the second collar, a second connecting plate extending outwardly and radially from the second abutment plate and abutting against the second end surface of the second flange, two second end plates each of which interconnects one end of the second abutment plate and a corresponding one end of the second connecting plate and each of which is formed with a second aperture, and a plurality of angularly spaced-apart second through holes formed in the second connecting plate.

Each of the second fasteners extends through the second aperture in one of the second end plates of one of the second clamp seats and the second aperture in an adjacent one of the second end plates of the other second clamp seat to fixedly interconnect the two adjacent second end plates.

Each of the connecting fasteners extends through one of the first through holes of one of the first clamp seats and a corresponding one of the second through holes of a corresponding one of the second clamp seats to fixedly interconnect the first and second clamp seats, thereby clamping the first and second flanges between the first and second clamp seats.

According to another aspect of the disclosure, a method for assembling underwater pipes includes the steps of:

(A) preparing a first pipe, a secondpipe and a connector apparatus, the first pipe extending along a longitudinal axis, an annular first collar projecting radially and outwardly from a peripheral end of the first pipe body, and a first flange projecting radially and outwardly from a peripheral end of the first collar and having a first end surface and a second end surface opposite to the first end surface along the longitudinal axis, the second pipe having a second pipe body, an annular second collar projecting radially and outwardly from a peripheral end of the second pipe body, and a second flange projecting radially and outwardly from a peripheral end of the second collar and having a first end surface abutting against said first end surface of the first flange, and a second end surface opposite to the first end surface of the second flange along the longitudinal axis, the connector apparatus including at least two first clamp seats, at least two second clamp seats and a plurality of connecting fasteners, each of the first clamp seats having a first abutment plate extending along the longitudinal axis, a first connecting plate extending outwardly and radially from the first abutment plate, two first end plates each of which interconnects one end of the first abutment plate and a corresponding end of the first connecting plate and each of which is formed with a first aperture, and a plurality of spaced-apart first through holes formed in the first connecting plate, each of the second clamp seats having a second abutment plate extending along the longitudinal axis, a second connecting plate extending outwardly and radially from the second abutment plate, two second end plates each of which interconnects one end of the second abutment plate and a corresponding end of the second connecting plate and each of which is formed with a second aperture, and a plurality of spaced-apart second through holes formed in the second connecting plate;

(B) abutting the first end surfaces of the first and second flanges against each other;

(C) placing the at least two first clamp seats on a junction of the first collar and the first flange such that the first abutment plates of the first clamp seats abut against an outer circumferential surface of the first collar and the first connecting plates of the first clamp seats abut against the second end surface of the first flange;

(D) extending each of the first fasteners through the first aperture in one of the first end plates of one of the first clamp seats and the first aperture in an adjacent one of the first end plates of the other first clamp seat to fixedly interconnect the two adjacent first endplates;

(E) placing the at least two second clamp seats on a junction of the second collar and the second flange such that the second abutment plates of the second clamp seats abut against an outer circumferential surface of the second collar and the second connecting plates of the second clamp seats abut against the second end surface of the second flange;

(F) extending each of the second fasteners through the second aperture in one of the second end plates of one of the second clamp seats and the second aperture in an adjacent one of the second end plates of the other second clamp seat to fixedly interconnect the two adjacent the second end plates; and (G) extending each of the connecting fasteners through one of the first through holes of one of the first clamp seats and a corresponding one of the second through holes of a corresponding one of the second clamp seats to fixedly interconnect the first and second clamp seats, thereby clamping the first and second flanges between the first and second clamp seats.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
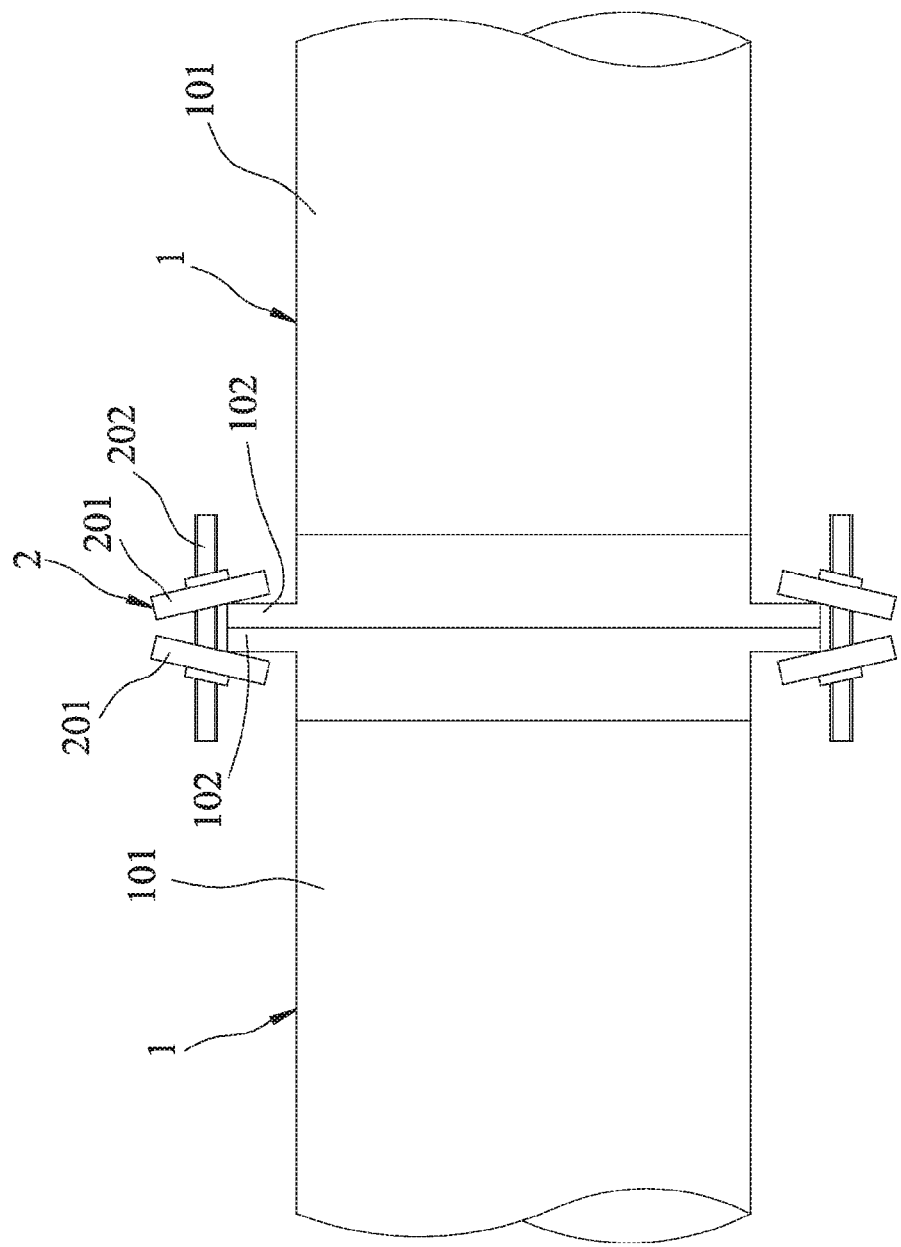
FIG. 1 is a fragmentary side view of a conventional underwater pipe assembly.
Figure 2:
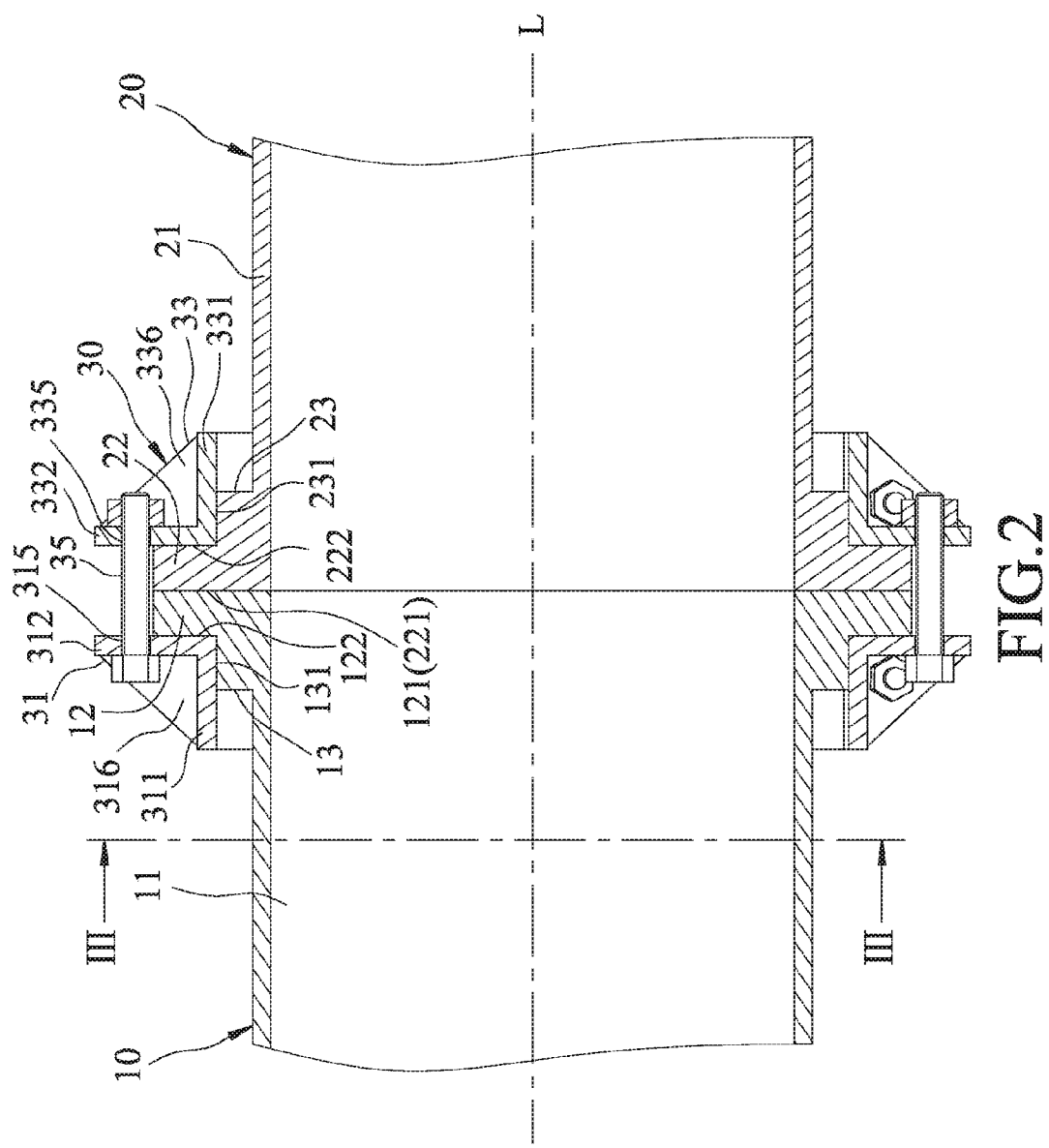
FIG. 2 is a fragmentary sectional side view of an embodiment of an underwater pipe assembly according to the disclosure.
Figure 3:
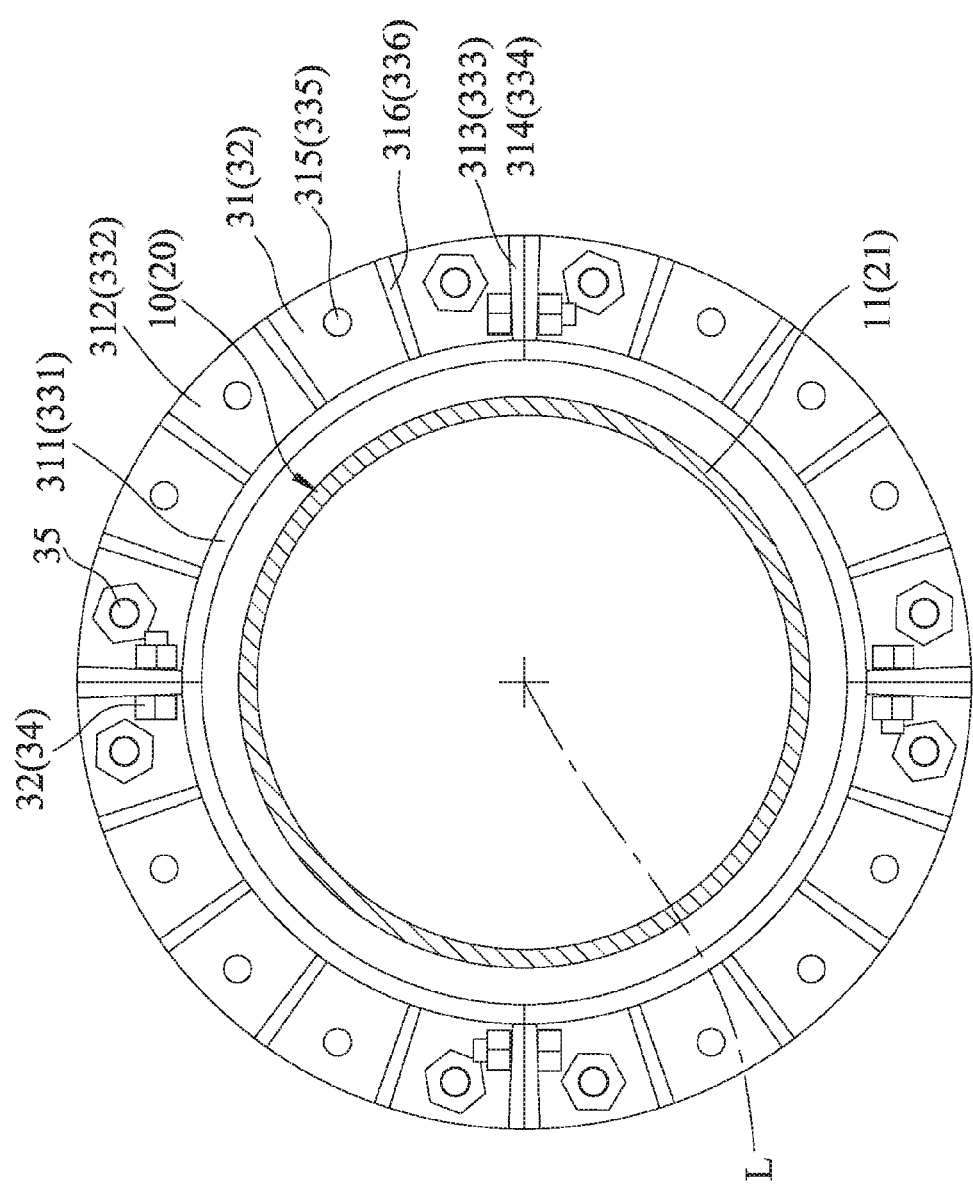
FIG. 3 is a sectional view of the embodiment taken along line III-III of FIG. 2.
Figure 4:
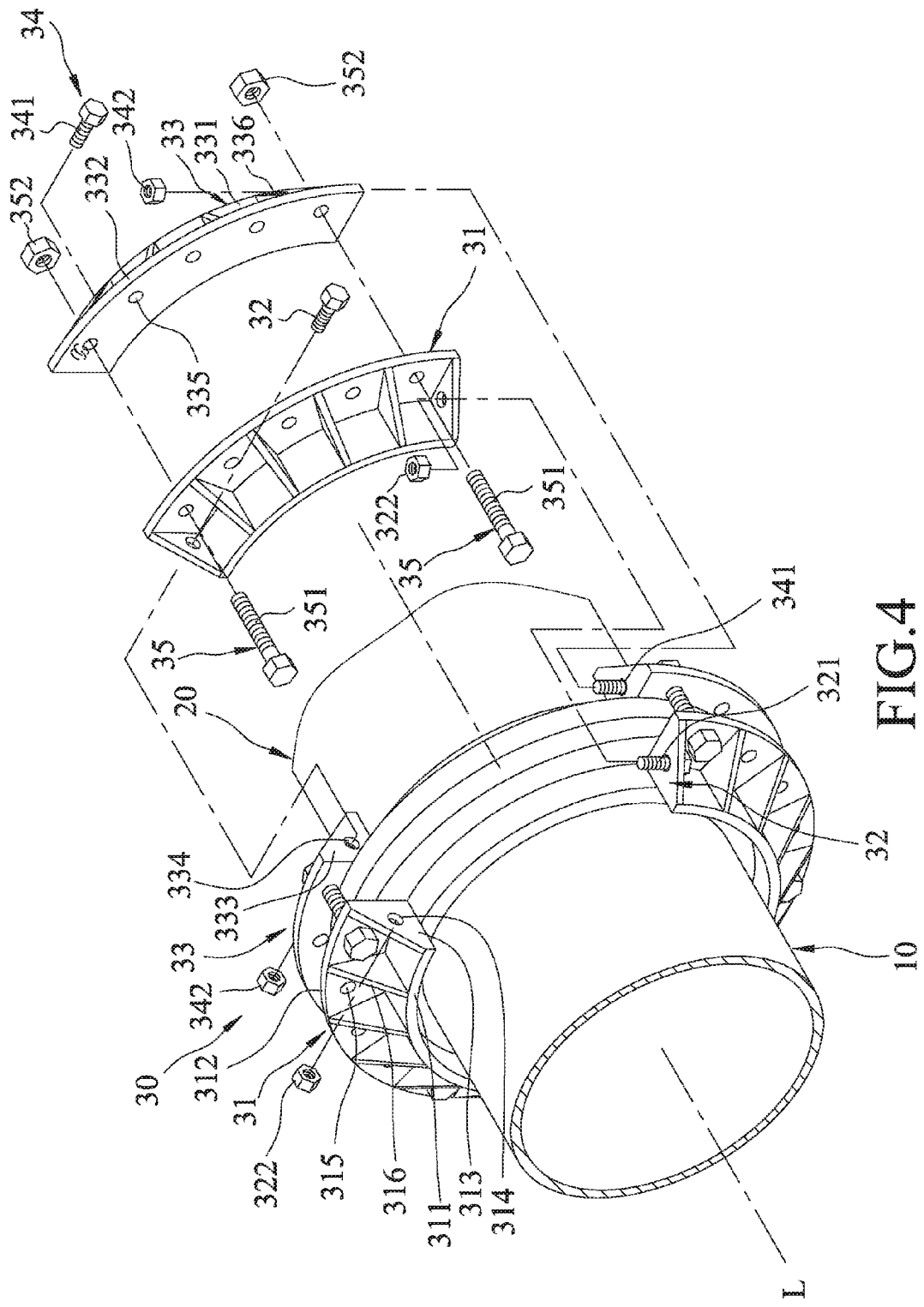
FIG. 4 is a fragmentary partly exploded perspective view of the embodiment.

Referring to FIGS. 2 to 4, an embodiment of a large-diameter underwater pipe assembly according to the disclosure is shown to include a first pipe 10, a second pipe 20 and a connector apparatus 30.

The first pipe 10 includes a first pipe body 11 extending along a longitudinal axis (L), an annular first collar 13 projecting radially and outwardly from a peripheral end of the first pipe body 11, and an annular first flange 12 projecting radially and outwardly from a peripheral end of the first collar 13 and having a first end surface 121 and a second end surface 122 opposite to the first end surface 121 along the longitudinal axis (L).

The second pipe 20 includes a second pipe body 21 extending along the longitudinal axis (L), an annular second collar 23 projecting radially and outwardly from a peripheral end of the second pipe body 21, and an annular second flange 22 projecting radially and outwardly from a peripheral end of the second collar 23 and having a first end surface 221 abutting against the first end surface 121 of the first flange 12, and a second end surface 222 opposite to the first end surface 221 along the longitudinal axis (L).

The connector apparatus includes a plurality of first clamp seats 31, a plurality of first fasteners 32, a plurality of second clamp seats 33, a plurality of second fasteners 34, and a plurality of connecting fasteners 35.

The first clamp seats 31 are disposed on and surround a junction of the first collar 13 and the first flange 12. Each of the first clamp seats 31 has a first abutment plate 311 extending along the longitudinal axis (L) and abutting against an outer circumferential surface 131 of the first collar 13, a first connecting plate 312 extending outwardly and radially from the first abutment plate 311 and abutting against the second end surface 122 of the first flange 12, two first end plates 313 each of which interconnects one end of the first abutment plate 311 and a corresponding one end of the first connecting plate 312 and each of which is formed with a first aperture 314, a plurality of angularly spaced-apart first through holes 315 formed in the first connecting plate 312, and a plurality of spaced-apart first ribs 316 connected between the first abutment plate 311 and the first connecting plate 312. In this embodiment, there are four first clamp seats 31 surrounding the junction of the first collar 13 and the first flange 12, and each of the first clamp seats 31 has a quarter arc shape. In practice, the number of the first clamp seat 31 may be varied according to the diameter size of the underwater pipes and may be one, two, eight, or sixteen.

Each first fastener 32 includes a bolt 321 extending through the first aperture 314 in one of the first end plates 313 of one of the first clamp seats 31 and the first aperture 314 in an adjacent one of the first end plates 313 of the other first clamp seat 31, and a nut 322 engaged to the bolt 321 to fixedly and integrally interconnect the two adjacent first end plates 313.

The second clamp seats 33 are disposed on and surround a junction of the second collar 23 and the second flange 22. Each second clamp seat 33 has a second abutment plate 331 extending along the longitudinal axis (L) and abutting against an outer circumferential surface 231 of the second collar 23, a second connecting plate 332 extending outwardly and radially from the second abutment plate 331 and abutting against the second end surface 222 of the second flange 22, two second end plates 333 each of which interconnects one end of the second abutment plate 331 and a corresponding one end of the second connecting plate 332 and each of which is formed with a second aperture 334, a plurality of angularly spaced-apart second through holes 335 formed in the second connecting plate 332, and a plurality of spaced-apart second ribs 336 connected between the second abutment plate 331 and the second connecting plate 332. In this embodiment, there are four second clamp seats 31 surrounding the junction of the second collar 23 and the second flange 22, and each of the second clamp seats 33 has a quarter arc shape. In practice, the number of the second clamp seat 33 may be varied according to the diameter size of the underwater pipes and may be one, two, eight, or sixteen.

Each second fastener 34 includes a bolt 341 extending through the second aperture 334 in one of the second end plates 333 of one of the second clamp seats 33 and the second aperture 334 in an adjacent one of the second end plates 323 of the other second clamp seat 33, and a nut 342 engaged to the bolt 341 to fixedly and integrally interconnect the two adjacent second end plates 333.

In this embodiment, each connecting fastener 35 includes a bolt 351 extending through one of the first through holes 315 of one of the first clamp seats 31 and a corresponding one of the second through holes 335 of a corresponding one of the second clamp seats 33, and a nut 352 engaged to the bolt 351 to fixedly interconnect the first and second clamp seats 31, 33, thereby clamping the first and second flanges 12, 22 between the first and second clamp seats 31, 33.

As shown in FIGS. 2 to 4, when the first fasteners 32 are used to interconnect the first clamp seats 31 so that the first clamp seats 31 surround the junction of the first collar 13 and the first flange 12, when the second fasteners 34 are used to interconnect the second clamp seats 32 so that the second clamp seats 33 surround the junction of the second collar 23 and the second flange 22, and when the connecting fasteners 35 are used to interconnect the first and second clamp seats 31, 32, the first and second flanges 12, 22 can be stably clamped between the first and second clamp seats 31, 32. Further, by abutting the first abutment plates 311 and the first connecting plates 312 of the first clamp seats 31 respectively against the outer circumferential surface 131 of the first collar 13 and the second end surface 122 of the first flange 12, and by abutting the second abutment plates 331 and the second connecting plates 332 of the second clamp seats 33 respectively against the outer circumferential surface 211 of the second collar 23 and the second end surface 222 of the second flange 22, the first and second pipes 10, 20 can be stably connected to each other.

The advantages of the underwater pipe assembly of the disclosure can be summarized as follows:

1. Because of the configurations of the first and second clamp seats 31, 32, the first clamp seats 31 can be interconnected by the first fasteners 32 to stably position on and surround the junction of the first collar 13 and the first flange 12, while the second clamp seats 32 can be interconnected by the second fasteners 34 to stably position on and surround the junction of the second collar 23 and the second flange 22.

2. By using the connecting fasteners 35 for connecting the first clamp seats 31 and the respective second clamp seats 33, a deviation of the first and second clamp seats 31, 33 relative to each other will not occur even if the fastening force of the connecting fasteners 35 is excessive. Through this, the efficiency of the connector apparatus 30 can be ensured so as to enhance the stability and strength of the interconnected first and second pipes 10, 20, so that occurrence of seawater leakage during pumping can be avoided.

With reference to FIGS. 2 to 4, a method for assembling large-diameter underwater pipes includes the following steps:

Step 1: preparing the first pipe 10, the second pipe 20 and the connector apparatus 30;

Step 2: abutting the first end surfaces 121, 221 of the first and second flanges 12, 22 against each other;

Step 3: placing the first clamp seats 31 on the junction of the first collar 13 and the first flange 12 such that the first abutment plates 311 of the first clamp seats 31 abut against an outer circumferential surface 131 of the first collar 13 and the first connecting plates 312 of the first clamp seats 31 abut against the second end surface 122 of the first flange 12;

Step 4: extending each of the first fasteners 32 through the first aperture 314 in one of the first end plates 313 of one of the first clamp seats 31 and the first aperture 314 in an adjacent one of the first end plates 313 of the other first clamp seat 31 to fixedly interconnect the two adjacent first end plates 313;

Step 5: placing the second clamp seats 33 on the junction of the second collar 23 and the second flange 22 such that the second abutment plates 331 of the second clamp seats 33 abut against an outer circumferential surface 231 of the second collar 23 and the second connecting plates 332 of the second clamp seats 32 abut against the second end surface 222 of the second flange 22;

Step 6: extending each of the second fasteners 34 through the second aperture 334 in one of the second end plates 333 of one of the second clamp seats 33 and the second aperture 334 in an adjacent one of the second end plates 333 of the other second clamp seat 33 to fixedly interconnect the two adjacent the second end plates 31, 33; and Step 7: extending each of the connecting fasteners 35 through one of the first through holes 315 of one of the first clamp seats 31 and a corresponding one of the second through holes 335 of a corresponding one of the second clamp seats 33 to fixedly interconnect the first and second clamp seats 31, 33, thereby clamping the first and second flanges 12, 22 between the first and second clamp seats 31, 33.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An underwater pipe assembly, comprising:
a first pipe including a first pipe body extending along a longitudinal axis, an annular first collar projecting radially and outwardly from a peripheral end of said first pipe body, and an annular first flange projecting radially and outwardly from a peripheral end of said first collar and having a first end surface and a second end surface opposite to said first end surface along the longitudinal axis;
a second pipe including a second pipe body extending along the longitudinal axis, an annular second collar projecting radially and outwardly from a peripheral end of said second pipe body, and an annular second flange projecting radially and outwardly from a peripheral end of said second collar and having a first end surface abutting against said first end surface of said first flange, and a second end surface opposite to said first end surface of said second flange along the longitudinal axis; and a connector apparatus including at least two first clamp seats disposed on and surrounding a junction of said first collar and said first flange, each of said first clamp seats having a first abutment plate extending along the longitudinal axis and abutting against an outer circumferential surface of said first collar, a first connecting plate extending outwardly and radially from said first abutment plate and abutting against said second end surface of said first flange, two first endplates each of which interconnects one end of said first abutment plate and a corresponding one end of said first connecting plate and each of which is formed with a first aperture, and a plurality of angularly spaced-apart first through holes formed in said first connecting plate, at least two first fasteners each of which extends through said first aperture in one of said first end plates of one of said first clamp seats and said first aperture in an adjacent one of said first endplates of the other said first clamp seat to fixedly interconnect the two adjacent said first end plates, at least two second clamp seats disposed on and surrounding a junction of said second collar and said second flange, each of said second clamp seats having a second abutment plate extending along the longitudinal axis and abutting against an outer circumferential surface of said second collar, a second connecting plate extending outwardly and radially from said second abutment plate and abutting against said second end surface of said second flange, two second endplates each of which interconnects one end of said second abutment plate and a corresponding one end of said second connecting plate and each of which is formed with a second aperture, and a plurality of angularly spaced-apart second through holes formed in said second connecting plate, at least two second fasteners each of which extends through said second aperture in one of said second end plates of one of said second clamp seats and said second aperture in an adjacent one of said second end plates of the other said second clamp seat to fixedly interconnect the two adjacent said second end plates, and a plurality of connecting fasteners each of which extends through one of said first through holes of one of said first clamp seats and a corresponding one of said second through holes of a corresponding one of said second clamp seats to fixedly interconnect said first and second clamp seats, thereby clamping said first and second flanges between said first and second clamp seats.

2. The underwater pipe assembly as claimed in claim 1, wherein each of said first clamp seats further has a plurality of spaced-apart first ribs connected between said first abutment plate and said first connecting plate, and each of said second clamp seats further has a plurality of spaced-apart second ribs connected between said second abutment plate and said second connecting plate.

3. The underwater pipe assembly as claimed in claim 1, wherein said connector apparatus includes four said first clamp seats surrounding the junction of said first collar and said first flange, and four said second clamp seats surrounding the junction of said second collar and said second flange, each of said first and second clamp seats having an arc shape.

4. A method for assembling underwater pipes, comprising the steps of:

(A) preparing a first pipe, a second pipe and a connector apparatus, the first pipe extending along a longitudinal axis, an annular first collar projecting radially and outwardly from a peripheral end of the first pipe body, and a first flange projecting radially and outwardly from a peripheral end of the first collar and having a first end surface and a second end surface opposite to the first end surface along the longitudinal axis, the second pipe having a second pipe body, an annular second collar projecting radially and outwardly from a peripheral end of the second pipe body, and a second flange projecting radially and outwardly from a peripheral end of the second collar and having a first end surface abutting against the first end surface of the first flange, and a second end surface opposite to the first end surface of the second flange along the longitudinal axis, the connector apparatus including at least two first clamp seats, at least two second clamp seats and a plurality of connecting fasteners, each of the first clamp seats having a first abutment plate extending along the longitudinal axis, a first connecting plate extending outwardly and radially from the first abutment plate, two first end plates each of which interconnects one end of the first abutment plate and a corresponding end of the first connecting plate and each of which is formed with a first aperture, and a plurality of spaced-apart first through holes formed in the first connecting plate, each of the second clamp seats having a second abutment plate extending along the longitudinal axis, a second connecting plate extending outwardly and radially from the second abutment plate, two second end plates each of which interconnects one end of the second abutment plate and a corresponding end of the second connecting plate and each of which is formed with a second aperture, and a plurality of spaced-apart second through holes formed in the second connecting plate;

(B) abutting the first end surfaces of the first and second flanges against each other;

(C) placing the at least two first clamp seats on a junction of the first collar and the first flange such that the first abutment plates of the first clamp seats abut against an outer circumferential surface of the first collar and the first connecting plates of the first clamp seats abut against the second end surface of the first flange;

(D) extending each of the first fasteners through the first aperture in one of the first end plates of one of the first clamp seats and the first aperture in an adjacent one of the first endplates of the other first clamp seat to fixedly interconnect the two adjacent first end plates;

(E) placing the at least two second clamp seats on a junction of the second collar and the second flange such that the second abutment plates of the second clamp seats abut against an outer circumferential surface of the second collar and the second connecting plates of the second clamp seats abut against the second end surface of the second flange;

(F) extending each of the second fasteners through the second aperture in one of the second end plates of one of the second clamp seats and the second aperture in an adjacent one of the second end plates of the other second clamp seat to fixedly interconnect the two adjacent the second end plates; and (G) extending each of the connecting fasteners through one of the first through holes of one of the first clamp seats and a corresponding one of the second through holes of a corresponding one of the second clamp seats to fixedly interconnect the first and second clamp seats, thereby clamping the first and second flanges between the first and second clamp seats.

\* \* \* \* \*